(12) United States Patent
Kim

(10) Patent No.: US 12,384,460 B2
(45) Date of Patent: Aug. 12, 2025

(54) STEERING ANGLE SENSING DEVICE

(71) Applicant: HL MANDO CORPORATION, Gyeonggi-do (KR)

(72) Inventor: Jinhwan Kim, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 53 days.

(21) Appl. No.: 17/799,274

(22) PCT Filed: Jan. 12, 2021

(86) PCT No.: PCT/KR2021/000408
§ 371 (c)(1),
(2) Date: Aug. 12, 2022

(87) PCT Pub. No.: WO2021/162248
PCT Pub. Date: Aug. 19, 2021

(65) Prior Publication Data
US 2024/0109586 A1   Apr. 4, 2024

(30) Foreign Application Priority Data
Feb. 13, 2020 (KR) .......... 10-2020-0017722

(51) Int. Cl.
*B62D 15/02* (2006.01)
*B62D 3/12* (2006.01)
(Continued)

(52) U.S. Cl.
CPC ........... *B62D 15/0225* (2013.01); *B62D 3/12* (2013.01); *B62D 6/10* (2013.01); *G01B 7/30* (2013.01);
(Continued)

(58) Field of Classification Search
CPC .............. B62D 15/021; B62D 15/0215; B62D 15/022; B62D 15/0225; B62D 3/12;
(Continued)

(56) References Cited

U.S. PATENT DOCUMENTS

| 2002/0117348 A1 | 8/2002 | Shimizu et al. |
| 2004/0108676 A1* | 6/2004 | Bareis ................... B62D 15/02 |
| | | 280/93.514 |

(Continued)

FOREIGN PATENT DOCUMENTS

| DE | 197 03 903 | 8/1998 |
| DE | 199 58 504 | 6/2001 |

(Continued)

OTHER PUBLICATIONS

Office Action dated Apr. 30, 2024 for German Patent Application No. 11 2021 001 001.8 and its English translation by Google Translate.

(Continued)

*Primary Examiner* — Benjamin R Schmitt
(74) *Attorney, Agent, or Firm* — WOMBLE BOND DICKINSON (US) LLP

(57) ABSTRACT

An apparatus for detecting a steering angle includes a pinion shaft coupled to a rack housing in which a rack bar is installed, the pinion shaft on which a pinion gear meshing with a rack gear is formed; a magnet disposed at one end of the pinion shaft and configured to rotate together with the pinion shaft; a printed circuit board (PCB) disposed at a predetermined distance from the magnet and including a magnetic sensor for detecting a rotation angle of a steering wheel connected to the pinion shaft; and a connector connected to the PCB to transmit a detected value measured by the magnetic sensor to an electronic control unit (ECU).

10 Claims, 8 Drawing Sheets

(51) Int. Cl.
*B62D 6/10* (2006.01)
*G01B 7/30* (2006.01)
*G01D 5/14* (2006.01)
*B62D 5/04* (2006.01)

(52) U.S. Cl.
CPC ............. *G01D 5/14* (2013.01); *B62D 5/0421* (2013.01); *G01D 5/145* (2013.01)

(58) Field of Classification Search
CPC .......... B62D 6/10; B62D 5/0421; G01D 5/14; G01D 5/142; G01D 5/145; G01B 7/30
See application file for complete search history.

(56) References Cited

U.S. PATENT DOCUMENTS

| | | |
|---|---|---|
| 2009/0072816 A1 | 3/2009 | Schrubbe et al. |
| 2009/0320613 A1* | 12/2009 | Uehira .................... G01L 3/104 73/862.333 |
| 2011/0181221 A1 | 7/2011 | Asahi et al. |

FOREIGN PATENT DOCUMENTS

| | | | | |
|---|---|---|---|---|
| DE | 101 26 423 | | 12/2002 | |
| DE | 10 2017 204 560 | | 9/2018 | |
| EP | 0856720 A1 | * | 12/1997 | ............ B62D 15/02 |
| JP | 07-000464 | | 1/1995 | |
| JP | 2004-521017 | | 7/2004 | |
| JP | 2005-075274 | | 3/2005 | |
| KR | 20070099346 A | * | 4/2006 | ............ G01M 17/06 |
| KR | 10-1758916 | | 7/2017 | |
| KR | 10-2018-0073970 | | 7/2018 | |

OTHER PUBLICATIONS

K. Reif: "Sensors in the Motor Vehicle", 2nd edition, Springer 2012, p. 141, Google Translate.

International Search Report for PCT/KR2021/000408 mailed on May 3, 2021 and its translation provided by WIPO (now published as WO 2021/162248).

Written Opinion of the International Searching Authority for PCT/KR2021/000408 mailed on May 3, 2021 and its English Machine Translation by Google Translate (now published as WO 2021/162248).

Office Action (1st) dated Dec. 8, 2024 for Chinese Patent Application No. 202180013573.6 and its English translation by Google Translate.

* cited by examiner

【FIG. 1】
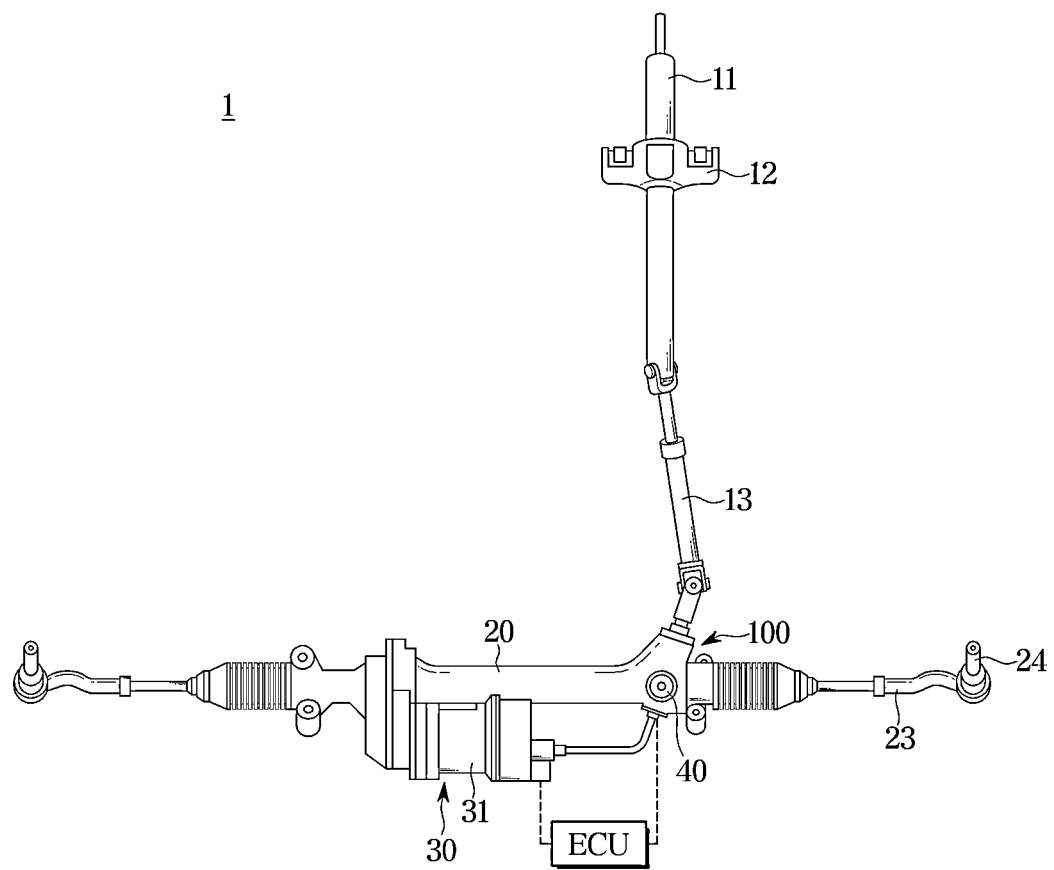

[FIG. 2]
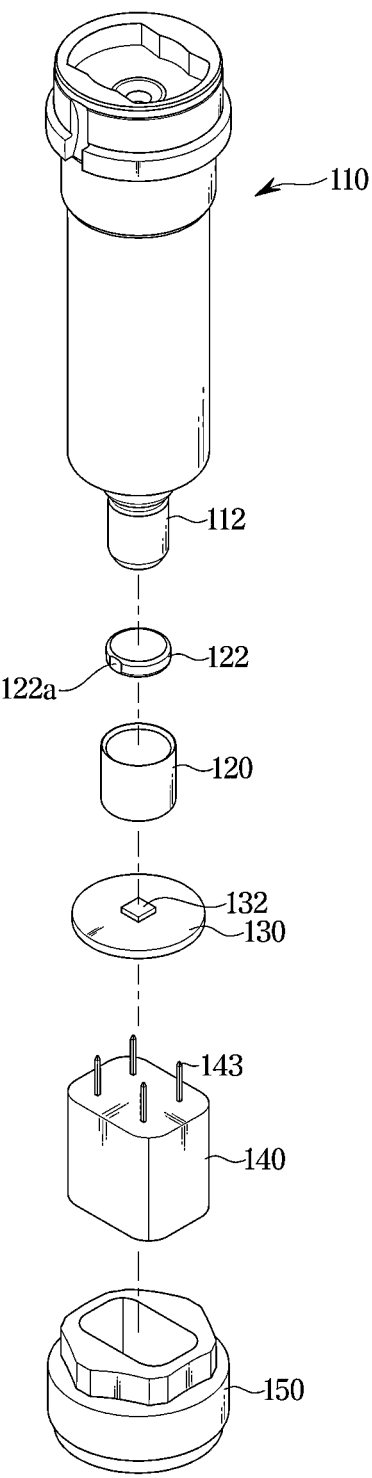

【FIG. 3】
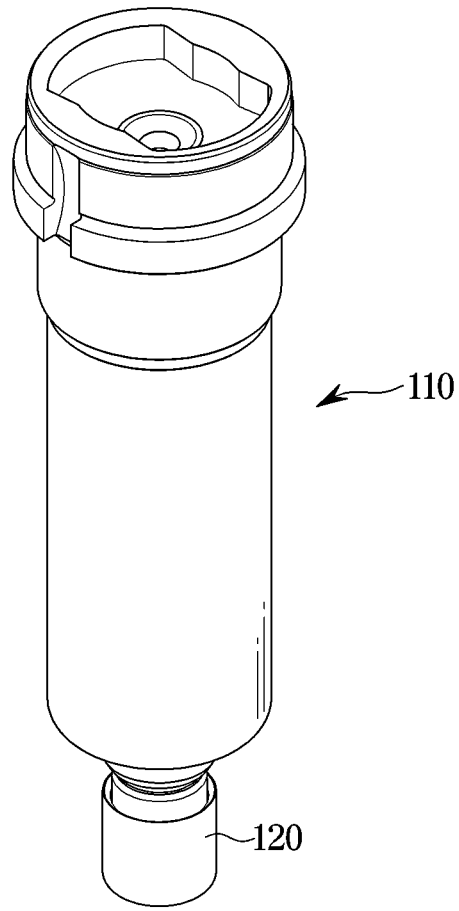
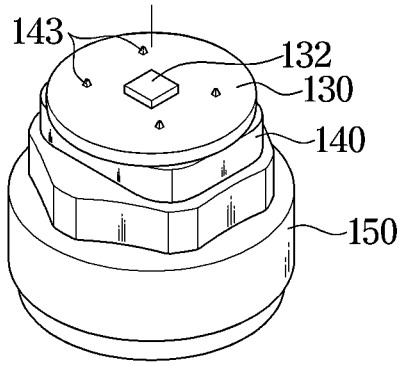

[FIG. 4]
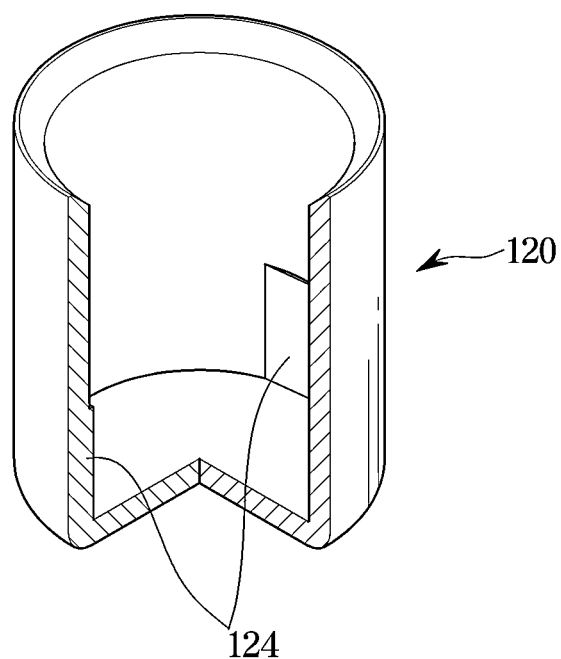

[FIG. 5]
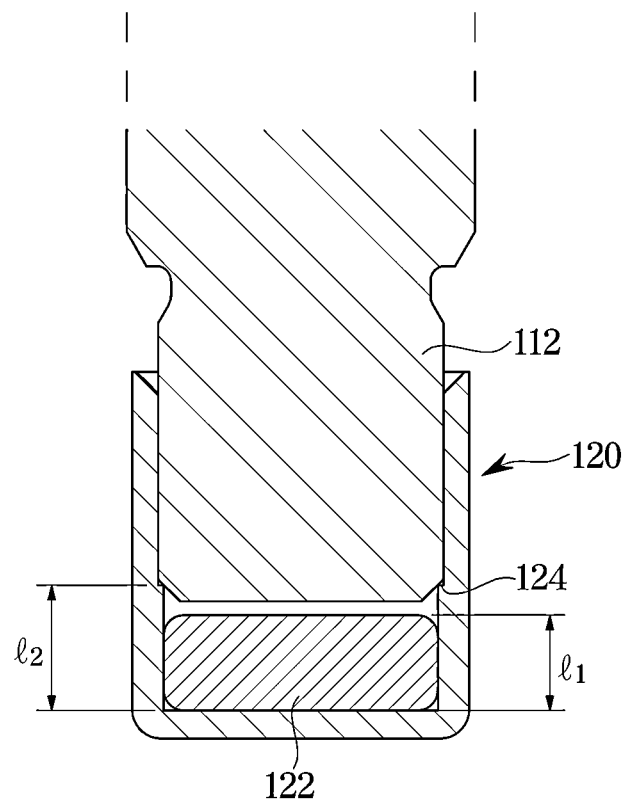

[FIG. 6]
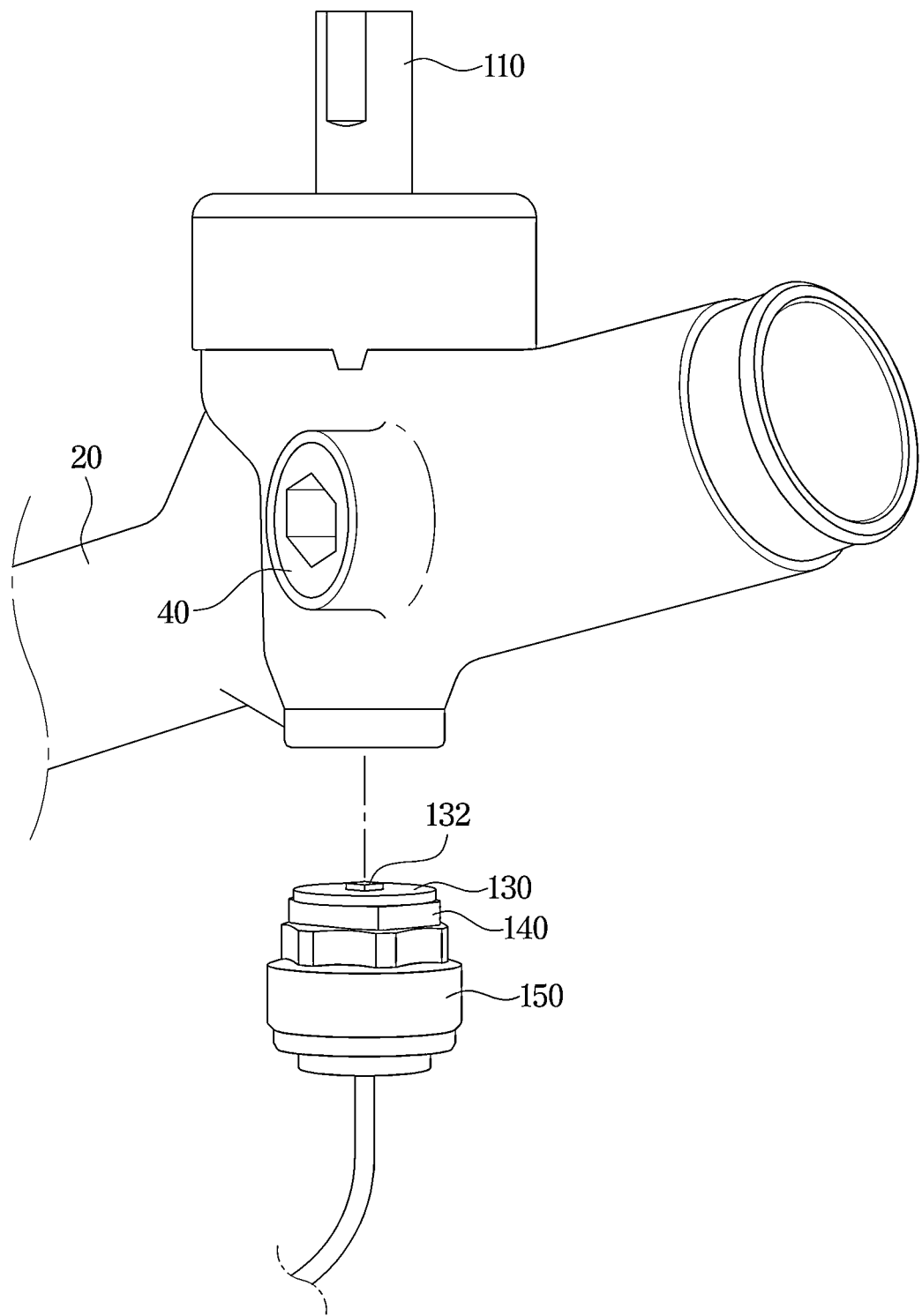

[FIG. 7]
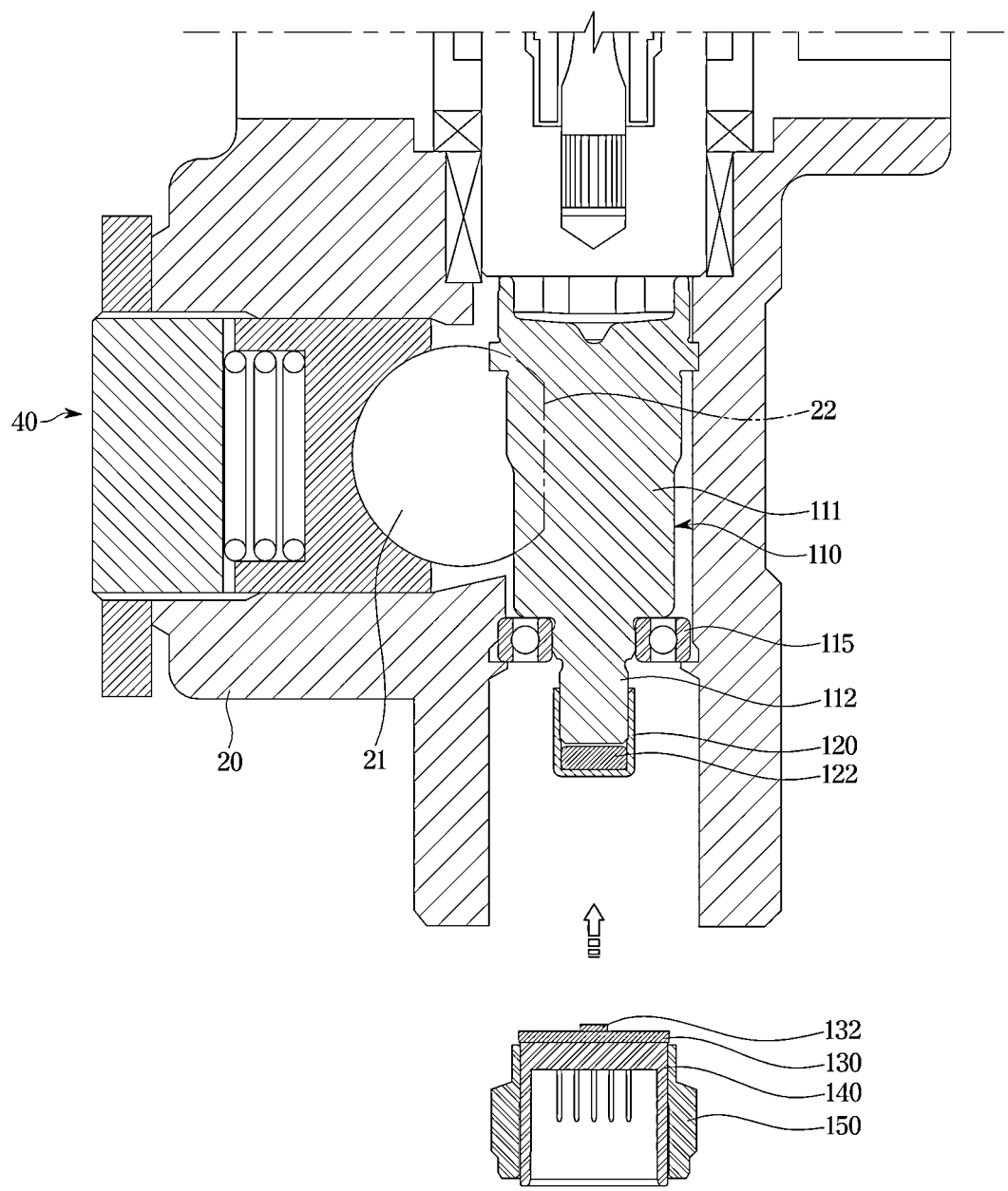

[FIG. 8]
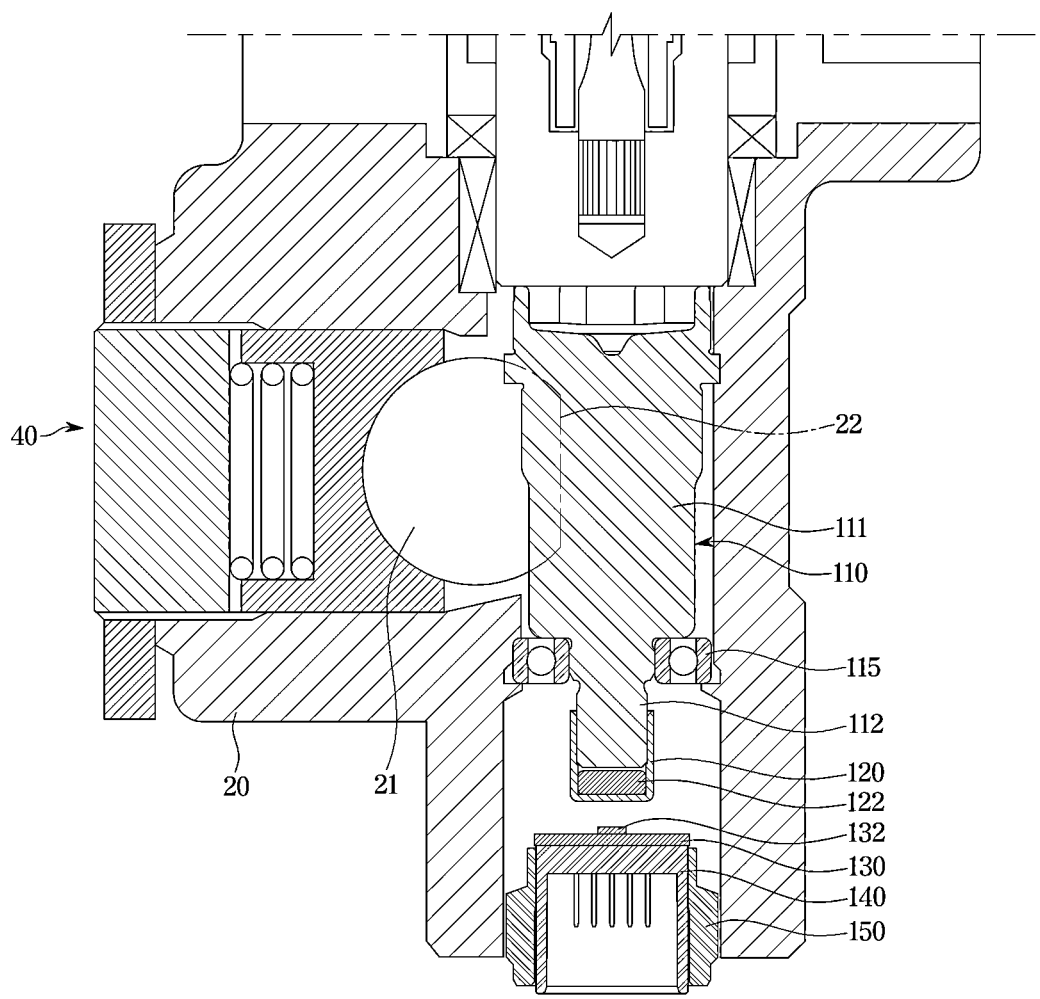

STEERING ANGLE SENSING DEVICE

CROSS-REFERENCE TO RELATED APPLICATIONS

This application is the national stage of International Patent Application No. PCT/KR2021/000408 filed on Jan. 12, 2021, which claims priority to Korean Patent Application No. 10-2020-0017722 filed in the Korean Intellectual Property Office on Feb. 13, 2020, the disclosures of which are incorporated by reference herein in their entireties.

TECHNICAL FIELD

The present disclosure relates to an apparatus for detecting a steering angle, and more particularly, to an apparatus for detecting a rotation angle of a steering wheel of a vehicle.

BACKGROUND ART

Generally, a vehicle is essentially equipped with a steering device, the steering device converts a route and direction of the vehicle according to a driver's request. Furthermore, a power-assisted steering device is used in a vehicle as a means for reducing steering force of a steering wheel (or a handle) to ensure stability of a steering state of the vehicle. Conventionally, a hydraulic power steering system (HPS) using a hydraulic pressure has been used as a power-assisted steering device, but recently, a rack assist type electronic power steering (R-EPS) that assists a driver in steering by using the torque of an electric motor has been installed in a vehicle.

Such electric steering devices may include a device for measuring a steering angle, and it is to measure the steering angle of the vehicle to assist steering force. For example, a device for measuring a steering angle is disclosed in Korean Patent Publication No. 10-2018-0073970. Referring to the disclosed document, the device for measuring a steering angle includes a main gear installed on a pinion shaft connected to a rack bar, two sub gears, and two sensors. A magnet is installed in each of the two sub gears, and when the sub gears meshing with the main gear rotate, the sensors measure change in magnetic field to calculate a rotation angle of a steering wheel.

However, because such EPSs require two sub-gears, magnets, and sensors, respectively, manufacturing cost is increased and as well as, structure thereof is complicated, and the installation space is limited.

DISCLOSURE

Technical Problem

An aspect of the disclosure is to provide an apparatus for detecting a steering angle capable of reducing manufacturing cost through a simple structure and easily detecting the steering angle.

Technical Solution

In accordance with an aspect of the present disclosure, an apparatus for detecting a steering angle includes a pinion shaft coupled to a rack housing in which a rack bar is installed, the pinion shaft on which a pinion gear meshing with a rack gear is formed; a magnet disposed at one end of the pinion shaft and configured to rotate together with the pinion shaft; a printed circuit board (PCB) disposed to be spaced apart from the magnet at a predetermined distance and including a magnetic sensor for detecting a rotation angle of a steering wheel connected to the pinion shaft; and a connector connected to the PCB to transmit a detected value measured by the magnetic sensor to an electronic control unit (ECU).

The magnet and the magnetic sensor may be arranged coaxially with a central axis of the pinion shaft.

The apparatus may further include a magnet holder provided in a cylindrical shape with one side open to accommodate and fix the magnet, and coupled to the pinion shaft.

The magnet holder may be provided with a locking protrusion formed on an inner circumferential surface thereof, and at least one of the locking protrusion may be provided along the inner circumferential surface of the magnet holder.

The locking protrusion may be formed to have a predetermined length from an inner bottom of the magnet holder, and the locking protrusion may have a length longer than a thickness of the magnet.

The pinion shaft may include a coupling portion on one end thereof, the coupling portion having a diameter smaller than that of a body in which the pinion gear is formed, the coupling portion is press-fitted through an open side of the magnet holder and is supported by the locking protrusion so that an end of the coupling portion and the magnet may be spaced apart from each other by a predetermined interval.

A plane having a shape corresponding to the locking protrusion on an outer circumferential surface of the magnet may be formed and press-fitted to the magnet holder.

The magnet may be fixed to the magnet holder by an adhesive.

The magnet may be provided integrally with the magnet holder by an insert injection.

The rack housing may have a lower side opened coaxially with the pinion shaft to provide a sensor accommodation portion, the apparatus may further includes a plug coupled to close the open lower side of the sensor accommodation portion.

The connector may be coupled such that a part thereof is exposed so as to be connected to the ECU after penetrating the plug.

The apparatus may further include a sealing portion configured to block an inflow of foreign substances between the connector and the plug.

Advantageous Effects

The apparatus for detecting the steering angle according to an exemplary embodiment of the present disclosure is configured to detect the steering angle through a simple structure by eliminating a conventional main gear, two sub gears, magnets and sensors, thereby reducing manufacturing costs.

Furthermore, the apparatus for detecting the steering angle according to an exemplary embodiment of the present disclosure may be applied to a conventional electric steering, so that it is practical. In addition, the apparatus for detecting a steering angle according to an exemplary embodiment of the present disclosure has a simple structure, so it takes advantage of securing an installation space and improving the degree of design freedom.

DESCRIPTION OF DRAWINGS

FIG. 1 is a schematic view illustrating an electronic power steering provided with an apparatus for detecting a steering angle according to an exemplary embodiment of the present disclosure.

FIG. 2 is an exploded perspective view illustrating the apparatus for detecting a steering angle according to an exemplary embodiment of the present disclosure.

FIG. 3 is a partial coupled perspective view of FIG. 2.

FIG. 4 is a partially-cut perspective view illustrating a magnet holder of the apparatus for detecting a steering angle according to an exemplary embodiment of the present disclosure.

FIG. 5 is a cross-sectional view illustrating a state in which the magnet holder and a pinion shaft of the apparatus for detecting a steering angle according to an exemplary embodiment of the present disclosure are coupled.

FIG. 6 is a perspective view illustrating a state in which the apparatus for detecting a steering angle according to an exemplary embodiment of the present disclosure is coupled to a rack housing.

FIG. 7 is a cross-sectional view illustrating a state in which the apparatus for detecting a steering angle according to an exemplary embodiment of the present disclosure is coupled to the rack housing.

FIG. 8 is a cross-sectional view illustrating the apparatus for detecting a steering angle according to an exemplary embodiment of the present disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a schematic view illustrating an electronic power steering (EPS) provided with an apparatus for detecting a steering angle according to an exemplary embodiment of the present disclosure.

Referring to FIG. 1, an EPS 1 includes a steering wheel (also referred to as a handle, not shown) disposed on a driver seat, a steering shaft 11 connected to the steering wheel, a steering column 12 for fixing the steering shaft 11 to a vehicle body, an intermediate shaft 13 that is connected to the steering column 12 to rotate together with the steering wheel and provided with a pair of universal joints, a pinion shaft 110 connected to the intermediate shaft 13, and an auxiliary power mechanism 30 for supplying a steering assistance power. Furthermore, the pinion shaft 110 is connected to a rack bar (see 21 in FIG. 5) accommodated in a rack housing 20, and opposite ends of the rack bar 21 are connected to a wheel of the vehicle through a tie rod 23 and a knuckle 24, respectively. In other words, as the rack bar 21 moves left and right by rotation of the pinion shaft 110, thereby enabling a steering of the vehicle.

The auxiliary power mechanism 30 includes an electronic control unit (ECU) that detects a steering torque applied by a driver to the steering wheel and generates a control signal based on an electric signal transmitted from the detected steering torque, a motor 31 for generating the steering assistance power based on the control signal transmitted from the ECU, and a gear unit for transmitting auxiliary power generated from the motor 31 to the rack bar 21 via a belt. The auxiliary power mechanism 30 is provided with a motor position sensor (MPS) to detect an angle of the steering wheel together with an apparatus for detecting a steering angle 100.

The structure of the EPS 1 has a well-known configuration, so a detailed description thereof will be omitted.

FIG. 2 is an exploded perspective view illustrating the apparatus for detecting a steering angle according to an exemplary embodiment of the present disclosure, FIG. 3 is a partial coupled perspective view of FIG. 2, FIG. 4 is a partially-cut perspective view illustrating a magnet holder of the apparatus for detecting a steering angle according to an exemplary embodiment of the present disclosure, FIG. 5 is a cross-sectional view illustrating a state in which the magnet holder and a pinion shaft of the apparatus for detecting a steering angle according to an exemplary embodiment of the present disclosure are coupled, FIG. 6 is a perspective view illustrating a state in which the apparatus for detecting a steering angle according to an exemplary embodiment of the present disclosure is coupled to a rack housing, FIG. 7 is a cross-sectional view illustrating a state in which the apparatus for detecting a steering angle according to an exemplary embodiment of the present disclosure is coupled to the rack housing, and FIG. 8 is a cross-sectional view illustrating the apparatus for detecting a steering angle according to an exemplary embodiment of the present disclosure.

Referring to FIGS. 2 to 8, the apparatus for detecting a steering angle 100 according to an exemplary embodiment of the present disclosure includes the pinion shaft 110, a magnet holder 120 coupled to one end of the pinion shaft 110 and provided with a magnet 122, a printed circuit board (PCB) 130 having a magnetic sensor 132, a connector 140 connected to the PCB 130 to transmit a detected value to the ECU, and a plug 150 coupled to the connector 140.

The pinion shaft 110 has a predetermined length and is provided to rotate together with the steering wheel, and a pinion gear 111 is formed on an outer circumferential surface thereof. One end of the pinion shaft 110 is provided with a coupling portion 112 having a smaller diameter than that of a body in which the pinion gear 111 is formed, and the other end thereof is connected to the intermediate shaft (see 13 in FIG. 1). The coupling portion 112 may be coupled to the magnet holder 120 to be described later. A structure in which the coupling portion 112 and the magnet holder 120 are coupled will be described again below. The pinion shaft 110 is coupled to the rack housing 20 so as to mesh with a rack gear 22 of the rack bar 21.

On the other hand, a reference numeral 115 undescribed denotes a bearing that rotatably supports the pinion shaft 110 in the rack housing 20 so that the pinion shaft 110 rotates stably.

In addition, a reference numeral 40 undescribed denotes a rack bar supporter, which elastically supports the rack bar 21 toward the pinion shaft 110 side so that the rack gear 22 and the pinion gear 111 may be maintained in a closely meshed state.

The magnet holder 120 is coupled to the coupling portion 112, and the magnet 122 is provided therein. The magnet holder 120 may be provided to have a cylindrical shape with one side open to accommodate the magnet 122. Furthermore, the magnet holder 120 may include a locking protrusion 124 protruding from an inner circumferential surface thereof. At least one locking protrusion 124 may be provided along the inner circumferential surface of the magnet holder 120. In particular, the locking protrusion 124 is formed to have a predetermined length from an inner bottom of the magnet holder 120 and may be provided to have a flat surface.

The magnet 122 may be fixed to the inner bottom of the magnet holder 120 through the opened side of the magnet holder 120. As shown in drawings, because the locking protrusion 124 is formed on the magnet holder 120, a plane 122*a* having a shape corresponding to the flat surface of the locking protrusion 124 may be formed on an outer circumferential surface of the magnet 122. Accordingly, after the plane 122*a* of the magnet 122 is arranged to correspond to the locking protrusion 124, the magnet 122 is press-fitted to the magnet holder 120. This is to prevent the magnet 122 from spinning in the magnet holder 120 when the magnet holder 120 is coupled to the coupling portion 112 of the pinion shaft 110 to rotate together. Meanwhile, although it has been illustrated and described as being supported by the locking protrusion 124 by forming the plane 122*a* on the magnet 122, it is not limited thereto, and any assembly structure may be used as long as the magnet 122 may be closely fixed to the magnet holder 120. For example, the magnet 122 may be fixed to the magnet holder 120 by an adhesive. Furthermore, the magnet holder 120 and the magnet 122 may be provided integrally by insert injection.

Meanwhile, the locking protrusion 124 has a predetermined length in a longitudinal direction of the magnet holder 120, in which case a length €2 of the locking protrusion 124 may be provided to have a length longer than a thickness €1 of the magnet 122.

The coupling portion 112 may be press-fitted through the opened side of the magnet holder 120 as described above. At this time, an end of the coupling portion 112 is provided to be caught on the locking projection 124. In other words, when the coupling portion 112 is press-fitted to the magnet holder 120, the coupling portion 112 is caught by the locking protrusion 124 and thus movement thereof is restricted, so that the end of the coupling portion 112 and the magnet 122 are spaced apart at a predetermined interval. Accordingly, it is possible to prevent the magnet 122 from being damaged by preventing excessive press-fitting of the coupling portion 112.

On the other hand, the above embodiment of the disclosure has been illustrated and described as the coupling portion 112 is coupled to the magnet holder 120 while being supported by the locking protrusion 124 so as to be spaced apart from the magnet 122 at a predetermined interval, but is not limited thereto. The coupling portion 112 may be provided to have a length that does not come into contact with the magnet 122 coupled to the magnet holder 120, and then be coupled to the magnet holder 120.

The PCB 130 includes the magnetic sensor 132 for detecting a rotation angle of the steering wheel. The PCB 130 is spaced apart from the magnet holder 120 by a predetermined interval. More specifically, various electrical elements and circuit wires are arranged on the PCB 130, and the magnetic sensor 132 is installed on a surface toward the magnet 122. In other words, the magnetic sensor 132 installed on the PCB 130 is provided to face the magnet 122, and the magnet 122 and the magnetic sensor 132 are spaced apart from each other by a predetermined interval. The magnetic sensor 132 is installed at a position facing the magnet 122 fixed to the magnet holder 120. The magnetic sensor 132 may be, for example, an Anisotropic Magneto Resistive (AMR) sensor, a Giant Magneto Resistance (GMR) sensor, or a Hall sensor, and the like. The magnetic sensor 132 detects change in magnetic field of the magnet 122 according to the rotation of the pinion shaft 110, and the PCB 130 processes a detection signal of the change in magnetic field of the magnetic sensor 132.

Meanwhile, the magnet 122 and the magnetic sensor 132 may be arranged coaxially with a central axis of the pinion shaft 110.

The connector 140 may be connected to the PCB 130 and provided to transmit the detected value measured by the magnetic sensor 132 of the PCB 130 to the ECU. The connector 140 may be connected to the PCB 130 through a connection terminal 143 in a press-fit manner, or may be electrically connected through a soldering. One end of the connector 140 may be connected to the PCB 130, and the other end thereof may be connected to an electronic control device or the ECU of the auxiliary power mechanism 30 through a separate socket or the like. Accordingly, the detection signal measured from the magnetic sensor 132 is transmitted to the ECU through the connector 140, and the rotation angle of the steering wheel is calculated and controlled through separate algorithms. The connector 140 may be coupled to the plug 150 to be described later.

The plug 150 is coupled to close an open lower side of the rack housing 20 positioned coaxially with the pinion shaft 110. The lower side of the rack housing 20 is opened so as to have a sensor accommodation portion in which the connector 140 coupled to the PCB 130 is accommodated. Accordingly, the plug 150 coupled to the connector 140 may be coupled to close the open lower side of the rack housing 20. When the plug 150 is press-fitted to the open lower side of the rack housing 20, the magnetic sensor 132 and the magnet holder 120 may be press-fitted so that there is a predetermined interval therebetween. This is to smoothly detect the change in the magnetic field of the magnet 122 through the magnetic sensor 132. Furthermore, the plug 150 may be provided to be screw-coupled to the rack housing 20. In other words, since the position of the magnetic sensor 132 may be adjusted according to the degree to which the plug 150 is screw-coupled to the rack housing 20, the distance between the magnetic sensor 132 and the magnet holder 120 may be adjusted.

On the other hand, the connector 140 may be coupled to be partially exposed so as to be connected to the ECU after penetrating the plug 150. As shown in drawings, the connector 140 is coupled and fixed to the plug 150, and a lower part thereof is exposed from the plug 150 to be connected to an electronic control device or the ECU provided in the auxiliary power mechanism 30. Accordingly, as described above, an exemplary embodiment of the present disclosure may measure the angle of the steering wheel precisely by calculating with a separate algorithm through the rotation angle of the pinion shaft 110 measured from the magnetic sensor 132 and a rotation speed of a motor measured from the MPS provided in the auxiliary power mechanism 30.

Furthermore, because the connector 140 is exposed from the plug 150, a sealing portion (not shown) may be provided to prevent foreign substances from entering between the connector 140 and the plug 150. The sealing portion may be made of a sealing member or a silicone, and by closing a gap between the connector and the plug through the sealing portion, an inflow of foreign substances may be blocked.

The apparatus for detecting a steering angle 100 as described above may use the pinion shaft 110, the magnet 112, the PCB 130, the connector 140, and the plug 150 as conventional components, and uses only the magnet holder 120 separately manufactured, so that the EPS 1 achieves a simple assembly, and further manufacturing cost due to the reduction in the number of parts may be reduced.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An apparatus for detecting a steering angle, comprising:
a pinion shaft coupled to a rack housing in which a rack bar is installed, the pinion shaft on which a pinion gear meshing with a rack gear is formed;
a magnet disposed on one end of the pinion shaft and configured to rotate together with the pinion shaft;
a printed circuit board (PCB) disposed to be spaced apart from the magnet at a predetermined distance and including a magnetic sensor for detecting a rotation angle of a steering wheel connected to the pinion shaft; and
a connector connected to the PCB to transmit a detected value measured by the magnetic sensor to an electronic control unit (ECU),
wherein:
the rack housing has a lower side opened coaxially with the pinion shaft to provide a sensor accommodation portion, and
the apparatus further comprises a plug coupled to close the open lower side of the sensor accommodation portion, and a sealing portion configured to block an inflow of foreign substances between the connector and the plug.

2. The apparatus of claim 1, wherein
the magnet and the magnetic sensor are arranged coaxially with a central axis of the pinion shaft.

3. The apparatus of claim 1, further comprising a magnet holder provided in a cylindrical shape with one side open to accommodate and fix the magnet, and coupled to the pinion shaft,
wherein
the locking protrusion is formed to have a predetermined length from an inner bottom of the magnet holder, and
the locking protrusion has a length longer than a thickness of the magnet.

4. The apparatus of claim 3, wherein
the pinion shaft includes a coupling portion on one end thereof, the coupling portion having a diameter smaller than that of a body in which the pinion gear is formed,
the coupling portion is press-fitted through an open side of the magnet holder and is supported by the locking protrusion so that an end of the coupling portion and the magnet may be spaced apart from each other by a predetermined interval.

5. The apparatus of claim 1, further comprising a magnet holder provided in a cylindrical shape with one side open to accommodate and fix the magnet, and coupled to the pinion shaft,
wherein:
the magnet holder is provided with a locking protrusion formed on an inner circumferential surface thereof,
the locking protrusion is provided along the inner circumferential surface of the magnet holder, and
a plane having a shape corresponding to the locking protrusion on an outer circumferential surface of the magnet is formed and press-fitted to the magnet holder.

6. The apparatus of claim 1, further comprising a magnet holder provided in a cylindrical shape with one side open to accommodate and fix the magnet, and coupled to the pinion shaft,
wherein the magnet is fixed to the magnet holder by an adhesive.

7. The apparatus of claim 1, further comprising a magnet holder provided in a cylindrical shape with one side open to accommodate and fix the magnet, and coupled to the pinion shaft,
wherein the magnet is provided integrally with the magnet holder by an insert injection.

8. The apparatus of claim 1, wherein the connector is coupled such that a part thereof is exposed so as to be connected to the ECU after penetrating the plug.

9. The apparatus of claim 1, further comprising a magnet holder provided in a cylindrical shape with one side open to accommodate and fix the magnet, and coupled to the pinion shaft.

10. The apparatus of claim 9, wherein the magnet holder is provided with a locking protrusion formed on an inner circumferential surface thereof, and
the locking protrusion is provided along the inner circumferential surface of the magnet holder.

* * * * *